Patented Aug. 5, 1930

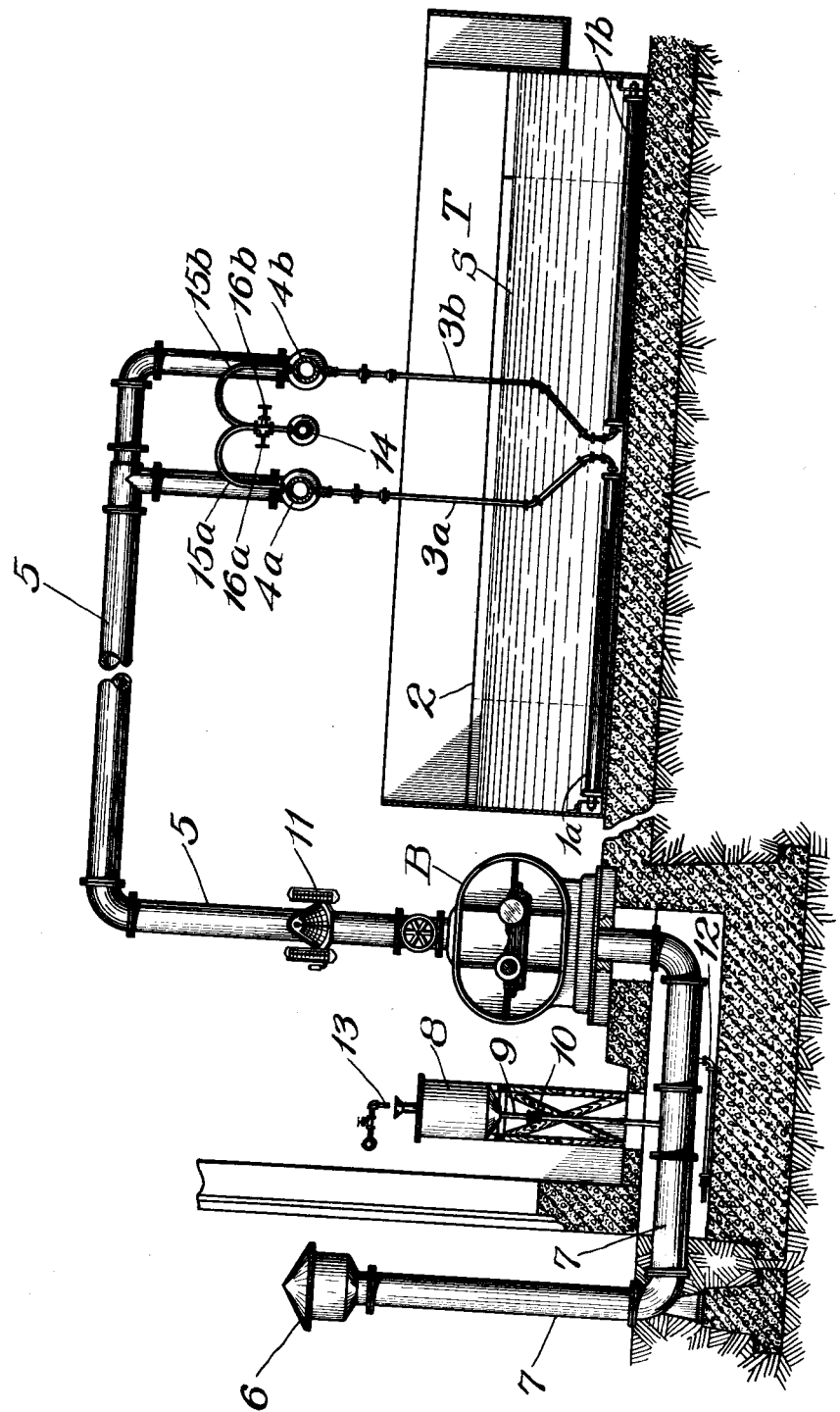

1,772,347

UNITED STATES PATENT OFFICE

HERBERT A. GOLLMAR, OF EAST ORANGE, NEW JERSEY, ASSIGNOR TO THE KOPPERS COMPANY, OF PITTSBURGH, PENNSYLVANIA, A CORPORATION OF PENNSYLVANIA

LIQUID-AERATION APPARATUS AND PROCESS

Application filed March 29, 1926. Serial No. 98,342.

This invention relates to the aeration of solutions by means of porous media. By reason of the high efficiency obtainable with porous media, it has been possible to aerate solutions with smaller quantities of air than have heretofore been necessary. However, by reason of the capillarity of porous aerators, the said solution tends to penetrate the fabric or structure thereof, and under the influence of the excess of air the solution that has thus penetrated the aerators tends to evaporate. The dissolved substances present in the said portion of the solution are thereby deposited in solid form in the interstices of the aerators, and, after an extended period of use of such aerator, may obstruct the passage of air therein. This condition causes at intervals of time high back pressures or, if not rectified, may even result in local stoppage, which increases pumping costs and necessitates frequent cleanings and replacements. An important object of the present invention is to provide means for preventing deposition, by evaporation or otherwise, of solid matters in the aerators, by satuating the air supplied to the same with moisture or with liquid or vapor effective for such purpose; and the invention has for other objects such other new and useful improvements, and such other operative advantages or results as may be found to obtain in the process and apparatus hereinafter described and claimed.

In general, the present invention has an important application to the practice of gas purification processes described and claimed in the prior co-pending applications of Frederick W. Sperr, Jr., Ser. No. 520,807, filed December 8, 1921; Ser. No. 718,253, filed June 6, 1924; and Serial Nos. 21,979, 21,982 and 21,983, filed April 9, 1925. Broadly stated, such processes comprise the purification of gases from hydrogen sulphide by washing the gases with an alkaline absorbing liquid wherein is suspended a finely divided compound of iron. A solution-suspension that has given excellent results in practice comprises a one per cent suspension of ferric oxide in a three per cent solution of sodium carbonate. The solution-suspension absorbs the hydrogen sulphide from the gases on contact with the same, and is later subjected to aeration out of contact with the gas by means of finely comminuted air whereby the sulphides present are oxidized to the original or other active compounds, with separation of free sulphur. The sulphur is removed from the liquid, and the revivified solution-suspension is returned to the gas washing apparatus, where it is used again to remove the impurities from the gas. The invention also has an important application to the treatment of sewage and the like, and more particularly any processes wherein the fabric aerators, shown and described in the co-pending application of Gilbert E. Seil, Ser. No. 21,978, filed April 9, 1925, are employed, but the invention may be applied with satisfactory results to any process involving aeration of solutions through porous media where high efficiency without the stoppages due to the above recited causes is desired. Such fabric aerators of Gilbert E. Seil, Ser. No. 21,978, comprise a tubular fabric of soft pliable porous material, such as chamois or closely woven material and they are suspended within the liquid so as to be vibratile under the influence of air that flows therethrough.

In the accompanying drawings forming a part of this specification, and showing, for purposes of exemplification, a preferred form and manner in which the invention may be embodied and practiced, but without limiting the claimed invention specifically to such illustrative instance or instances:—

The figure is an elevational view, partly in section, of apparatus for the actification of spent gas purification liquors, constructed in accordance with the present invention.

With particular reference to the figure, the tubular fabric aerators $1^a$ and $1^b$ are horizontally disposed in the thionizer tank T, which may be divided into compartments by the vertically disposed baffle plates 2. Actifier air enters the said aerators $1^a$ and $1^b$ through the pipes $3^a$ and $3^b$, from the headers $4^a$ and $4^b$ supplied by the blower B through the line 5. Air is drawn from the atmosphere by the said blower B through the air cleaner 6 and the intake line 7. In accordance with the present invention the air is wetted before it reaches the aerators 1ª and 1ᵇ, and preferably sufficient water is added to the actifier air to completely saturate it. Said water may be introduced into the intake line 7 from the reservoir 8 through the feeder 9. Said feeder is provided with the valve 10, which regulates the flow of water passing into the intake line 7. The water on entering the intake line 7 is drawn into the blower B, where the rotary action of the blades therein helps to atomize the water that has been added.

Thus the actifier air that passes through the aerators 1ª and 1ᵇ into the solution S in the thionizer T, may be maintained so saturated or over-saturated that evaporation of any solution that has penetrated the said aerators will be prevented, thus also preventing any evaporation and deposition of soluble materials.

A convenient means for determining the humidity of the actifier air is the hygrometer or "hygrodeik" 11 with wet and dry bulb thermometers inserted in the line 5.

The drain 12 provides a means for removing any condensed water which accumulates in the intake line 7. The feed line 13 forms a convenient means for filling the reservoir 8.

The saturation of the actifier air may be accomplished, when so desired, by means of steam instead of water or by means of other suitable liquid or vapor. Means for saturating the air being fed to the aerators 1ª and 1ᵇ with steam are provided by the steam line 14 and the conduits 15ª and 15ᵇ. The admission of steam at this point may be controlled by the valves 16ª and 16ᵇ.

The invention as hereinabove set forth is embodied in particular forms but may be variously embodied within the scope of the claims hereinafter made.

I claim:

1. In a process of regenerating a spent liquid employed for removing hydrogen sulphide from gases, said spent liquid comprising iron sulphide in alkaline solution, the steps comprising humidifying air before it is finely comminuted and finely comminuting said air as it enters the solution.

2. In a process of aerating liquids involving passing air into such liquids through porous members, the improvement which consists in: humidifying such air before it reaches such porous members.

3. A process as claimed in claim 1 characterized by effecting such humidifying with steam.

4. A process as claimed in claim 2 characterized by effecting such humidifying with steam.

5. A process as claimed in claim 2 characterized by humidifying the air to the saturation point.

6. In a process of regenerating by aeration a spent liquid employed for removing hydrogen sulphide from gases, said liquid comprising iron sulphide suspended in alkaline solution, and in which the air is passed through porous material disposed in said liquid before entering the liquid, the improvement comprising humidifying the air before it reaches the porous members to prevent deposition, by evaporation or otherwise, in the porous members of solid matters from the liquid being aerated.

7. Apparatus for aerating liquors containing dissolved materials with finely atomized air comprising, in combination: a tank for holding said liquors; porous members therein adapted to be submerged in said tank; an air intake conduit connected with said porous members to supply air thereto; and a water feeder connected to said intake conduit; whereby to prevent deposition, by evaporation or otherwise, of solid matters in the porous members by saturating the air supplied to the same with moisture.

8. Apparatus for aerating sulphided wash liquor with finely atomized air comprising, in combination: a tank for holding said liquors; tubular pliable porous members therein; an air line communicably connected with the interior of said tubular members; a pump in said air line; and a water line connected with said air line.

9. Apparatus for aerating sulphided wash liquor with finely atomized air comprising, in combination: a tank for holding said liquors; pliable porous members therein; an air line connected with said pliable porous members for supplying air therethrough; a fresh air inlet in said air line; a pump in said air line; and a feed water line connected to said air line between the pump and the fresh air inlet to said air line.

In testimony whereof I have hereunto set my hand.

HERBERT A. GOLLMAR.